(12) United States Patent
Xing (10) Patent No.: US 10,469,532 B2
(45) Date of Patent: Nov. 5, 2019

(54) PREVENTING DNS CACHE POISONING

(71) Applicant: HANGZHOU DPTECH TECHNOLOGIES CO., LTD., Hangzhou (CN)

(72) Inventor: Tao Xing, Hangzhou (CN)

(73) Assignee: Hangzhou DPtech Technologies Co., Ltd., Hangzhou (CN)

( * ) Notice: Subject to any disclaimer, the term of this patent is extended or adjusted under 35 U.S.C. 154(b) by 95 days.

(21) Appl. No.: 15/413,194

(22) Filed: Jan. 23, 2017

(65) Prior Publication Data

US 2017/0264590 A1    Sep. 14, 2017

(30) Foreign Application Priority Data

Mar. 9, 2016 (CN) .......................... 2016 1 0134542

(51) Int. Cl.
*H04L 29/06* (2006.01)
*H04L 29/12* (2006.01)
*H04W 12/12* (2009.01)

(52) U.S. Cl.
CPC ...... *H04L 63/1466* (2013.01); *H04L 61/1511* (2013.01); *H04L 61/6009* (2013.01);
(Continued)

(58) Field of Classification Search
CPC ............. H04L 61/1511; H04L 63/1441; H04L 63/1483; H04L 63/1466; G06F 21/566; H04W 12/12

See application file for complete search history.

(56) References Cited

U.S. PATENT DOCUMENTS

| | | | | |
|---|---|---|---|---|
| 2010/0121981 A1* | 5/2010 | Drako | ................. | H04L 61/1511 709/245 |
| 2012/0180125 A1* | 7/2012 | Sun | ..................... | H04L 63/1441 726/22 |
| 2012/0297478 A1* | 11/2012 | Martin | .............. | H04L 29/12066 726/22 |

FOREIGN PATENT DOCUMENTS

| | | |
|---|---|---|
| CN | 101827136 A | 9/2010 |
| CN | 102035809 A | 4/2011 |

(Continued)

OTHER PUBLICATIONS

"Machine Translation of CN 1102035809," Espacenet, https://worldwide.espacenet.com/publicationDetails/originalDocument?FT=D&date=20130424&DB=&locale=en_EP&CC=CN&NR=102035809B&KC=B&ND=4 (Year: 2013).*

(Continued)

*Primary Examiner* — Robert B Leung
*Assistant Examiner* — Carlos M De Jesus Lassala
(74) *Attorney, Agent, or Firm* — McCoy Russell LLP (57) ABSTRACT

The present disclosure provides a method and a device for preventing DNS cache poisoning. According to an example of the method, a preventing equipment may forward a first DNS query request packet sent by a DNS server to a first authoritative DNS server. The preventing equipment may construct a second DNS query request packet including the target domain name and send the second DNS query request packet to a second authoritative DNS server when a first DNS reply packet received for the first DNS query request packet indicates a DNS cache poisoning attack occurs. When a second DNS reply packet received for the second DNS query request packet indicates no DNS cache poisoning attack occurs, the preventing equipment may generate a final DNS reply packet according to the second DNS reply (Continued)

packet and feed back the final DNS reply packet to the DNS server.

18 Claims, 5 Drawing Sheets

(52) U.S. Cl.
CPC ...... *H04L 63/1416* (2013.01); *H04L 63/1483* (2013.01); *H04W 12/12* (2013.01); *H04L 2463/145* (2013.01)

(56) References Cited

FOREIGN PATENT DOCUMENTS

| | | | |
|---|---|---|---|
| CN | 102404317 | * | 4/2012 |
| CN | 101827136 | * | 4/2013 |
| CN | 102035809 | * | 4/2013 |
| CN | 103685168 A | | 3/2014 |
| CN | 103747005 A | | 4/2014 |
| CN | 103685168 | * | 12/2016 |

OTHER PUBLICATIONS

"Machine Translation of CN 103685168," Espacenet, https://worldwide.espacenet.com/publicationDetails/originalDocument?FT=D&date=20161207&DB=&locale=en_EP&CC=CN&NR=103685168B&KC=B&ND=4 (Year: 2016).*

Machine translation of Zhang, CN 101827136, Apr. 2013, date retreived on May 1, 2019, https://worldwide.espacenet.com/publicationDetails/originalDocument?FT=D&date=20130424&DB=&locale=en_EP&CC=CN&NR=101827136B&KC=B&ND=4 (Year: 2013).*

Chong, J. et al., "Principles and Defense Strategies of DNS Cache Poisoning," China Communications, vol. 6. No. 4, Nov. 2009, 6 pages. (Submitted with English Abstract).

State Intellectual Property Office of the People's Republic of China, Office Action and Search Report Issued in Application No. 201610134542.7, dated Jul. 18, 2018, 17 pages. (Submitted with Partial Translation).

State Intellectual Property Office of the People's Republic of China, Office Action and Search Report Issued in Application No. 201610134542.7, dated Mar. 7, 2019, 10 pages.

* cited by examiner

PREVENTING DNS CACHE POISONING

CROSS-REFERENCE TO RELATED APPLICATIONS

The present application claims priority to Chinese Patent Application No. 201610134542.7, filed on Mar. 9, 2016, the entire contents of which are hereby incorporated by reference for all purposes.

TECHNICAL FIELD

The present disclosure relates to preventing DNS cache poisoning in the technical field of network communications.

BACKGROUND

A basic function of a Domain Names System (DNS) server may be resolving domain names to provide a mapping relation between Internet Protocol (IP) address and domain name for a terminal. A DNS server may record a mapping relation between IP address of a local terminal or a server and domain name. Besides, if a mapping relation between target domain name requested to be resolved by a terminal and IP address does not exist in a DNS server, the DNS server may send a DNS query request packet to an authoritative DNS server to obtain the mapping relation between IP address of a non-local terminal or a server and domain name. Then the DNS server may save the obtained mapping relation to form a DNS cache.

However, the DNS cache may be vulnerable to a DNS cache poisoning attack. For example, a fake IP address may be used to replace a real IP address obtained from the authoritative DNS server, thus causing information cached in the DNS server to be fake information.

In order to prevent DNS cache poisoning, a DNS server may randomly generate a source port and a DNS request identity (ID) for a DNS query request packet, such that an attacker needs to make numerous attempts to match these parameters before possible successful poisoning. The DNS server may also prevent DNS cache poisoning by adjusting configurations thereof. For example, the DNS cache may be encrypted by Domain Name System Security Extensions (DNSSEC) technology, or a Transmission Control Protocol (TCP) function may be enabled on the DNS server.

SUMMARY

In view of this, the present application provides a method and a device for preventing DNS cache poisoning in order to improve reliability and applicability for preventing DNS cache poisoning.

According to a first aspect of embodiments of the present disclosure, a method of preventing DNS cache poisoning is provided. The method may comprise:

forwarding, by a preventing equipment, a first DNS query request packet sent by a DNS server to a first authoritative DNS server. The first DNS query request packet includes a target domain name requested to be resolved;

constructing, by the preventing equipment, a second DNS query request packet including the target domain name when a first DNS reply packet received for the first DNS query request packet indicates a DNS cache poisoning attack occurs;

sending, by the preventing equipment, the second DNS query request packet to a second authoritative DNS server, where the second authoritative DNS server is different from the first authoritative DNS server and has a same domain name-IP address mapping relation with the first authoritative DNS server;

generating, by the preventing equipment, a final DNS reply packet according to a second DNS reply packet when the second DNS reply packet received for the second DNS query request packet indicates no DNS cache poisoning attack occurs. The second DNS reply packet and the final DNS reply packet include an IP address corresponding to the target domain name;

feeding back, by the preventing equipment, the final DNS reply packet to the DNS server.

According to a second aspect of embodiments of the present disclosure, a device for preventing DNS cache poisoning is provided. The device for preventing DNS cache poisoning may comprise a processor, which invokes machine readable instructions corresponding to a control logic for preventing DNS cache poisoning stored on a storage medium and executes the machine readable instructions to:

forward a first DNS query request packet sent by a DNS server to a first authoritative DNS server, where the first DNS query request packet may include a target domain name requested to be resolved;

construct a second DNS query request packet including the target domain name when a first DNS reply packets received for the first DNS query request packet indicates a DNS cache poisoning attack occurs;

send the second DNS query request packet to a second authoritative DNS server, where the second authoritative DNS sever is different from the first authoritative DNS server and has a same domain name-IP address mapping relation with the first authoritative DNS server;

generate a final DNS reply packet according to a second DNS reply packet when the second DNS reply packet received for the second DNS query request packet indicates no DNS cache poisoning attack occurs, where the second DNS reply packet and the final DNS reply packet may include an IP address corresponding to the target domain name; and feed back the final DNS reply packet to the DNS server.

With a DNS query request packet being continuously sent to any other authoritative DNS server when the DNS cache poisoning attack occurs, it may be difficult for an attacking server to construct a DNS reply packet capable of passing matching check because the specific other authoritative DNS server to which the preventing equipment sends the DNS query request packet may be not known to the attacking server. Thus, probability for achieving DNS cache poisoning by the attacking server may be greatly reduced. Also, as the DNS server does not need to be configured, the method may be easy to deploy and good in applicability.

DETAILED DESCRIPTION OF THE PREFERRED EMBODIMENTS

Here, exemplary embodiments will be explained in detail with examples thereof shown in the accompanying drawings. When following descriptions involve the accompanying drawings, like reference numerals in different drawings may denote same or similar elements unless stated otherwise. Implementations described in the following exemplary embodiments do not represent all implementations in accordance with the present disclosure. On the contrary, they are merely examples of a device and a method in accordance with some aspects of the present disclosure described in detail in the appended claims.

A DNS may be a distributed domain name service system. A large number of domain name-IP address mapping relations may be stored on each DNS server and also be dynamically updated. For example, a mapping relation between domain name and IP address may be newly added in a DNS server. A DNS server may only record a mapping relation between IP address of a local terminal or a server and domain name. When a mapping relation between target domain name requested to be resolved by a terminal and IP address does not exist in the DNS server, the DNS server may send a DNS query request packet to an authoritative DNS server in which all mapping relations between domain name and IP address are stored. The DNS query request packet may carry the target domain name therein.

A source IP address of the DNS query request packet may be the IP address of the DNS server, a destination IP address of the DNS query request packet may be an IP address of the authoritative DNS server, and a destination port of the DNS query request packet may be a fixed port, e.g., port 53. The source IP address, the destination IP address and the destination port of the DNS query request packet may be constant. For example, the source IP address, the destination IP address and the destination port carried in all DNS query request packets sent by the DNS server to authoritative DNS servers may be identical.

In addition, a source port of the DNS query request packet may be selected at random. For example, the source port may be port 1234. In a case that the DNS server does not support a function of selecting the source port at random, the source IP addresses, the destination IP addresses, the source ports and the destination ports in different DNS query request packets sent by the DNS server to authoritative DNS servers may be identical.

Furthermore, the DNS query request packet may also include a DNS request ID generated at random, e.g., 4321.

An authoritative DNS server may send a DNS reply packet carrying an IP address corresponding to the target domain name to the DNS server upon receiving the DNS query request packet. In this case, the DNS server may use a simple trust mechanism. For example, a matching check may be carried out only to a source IP address, a destination port and a DNS request ID of the DNS reply packet, including checking whether the source IP address, the destination port and the DNS request ID of the DNS reply packet are identical to the destination IP address, the source port and the DNS request ID of the DNS query request packet sent before, respectively. If the above three items are all identical, it may be considered that the matching check is passed. Thus, the DNS server may obtain the IP address corresponding to the target domain name from the DNS reply packet, and may also save a corresponding relation between the target domain name and the IP address in a local cache, thereby forming a DNS cache for facilitating later queries.

However, an attacker may carry out DNS cache poisoning with technical means. For example, before the DNS reply packet sent by an authoritative DNS server reaches the DNS server, a fake DNS reply packet may be enabled to reach the DNS server and pass the matching check, causing the DNS server to save a wrong domain name-IP address mapping relation. By DNS cache poisoning, an IP address corresponding to a domain name may be replaced with a malicious Uniform Resource Locator (URL). In this way, a user may be guided to the malicious URL when accessing the domain name, thereby impacting user experience and even the security of the user.

Figure 1:
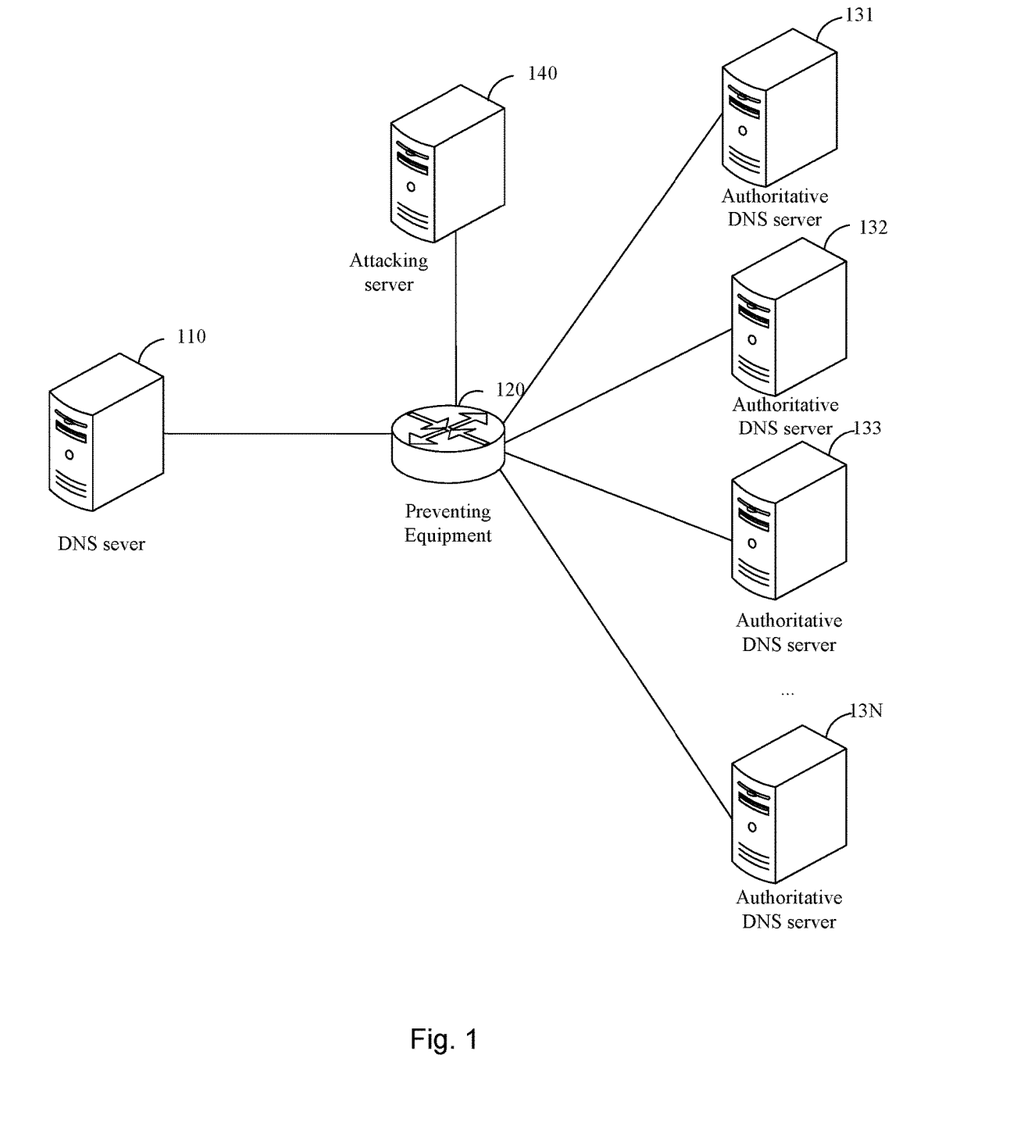
FIG. 1 is a schematic diagram of an application scenario for a method of preventing DNS cache poisoning according to an embodiment of the present disclosure.

In order to prevent DNS cache poisoning, the present disclosure provides a method and a device for preventing DNS cache poisoning. FIG. 1 is a schematic diagram of an application scenario for a method of preventing DNS cache poisoning according to an embodiment of the present disclosure.

In FIG. 1, the application scenario may include a DNS server 110, a preventing equipment 120, authoritative DNS servers 131-13N, and an attacking server 140. As shown in FIG. 1, the preventing equipment 120 may be located between the authoritative DNS servers 131-13N and the DNS server 110. Thus, a DNS reply packet sent by each of the authoritative DNS servers to the DNS server may be first transmitted to the preventing equipment 120, and a fake DNS reply packet sent by the attacking server 140 may also be first transmitted to the preventing equipment 120. In the present disclosure, a domain name-IP address mapping relation saved in each of the authoritative DNS servers 131-13N may be identical.

The preventing equipment 120 may execute the method of preventing DNS cache poisoning provided by an example of the present disclosure. For example, a DNS reply packet received may be checked by the preventing equipment 120, and the DNS reply packet may be sent to the DNS server 110 only after it is identified as being not attacked by DNS cache poisoning. Thus, reliability and applicability for preventing DNS cache poisoning may be improved and dependence on configurations of the DNS server may be reduced.

Figure 2:
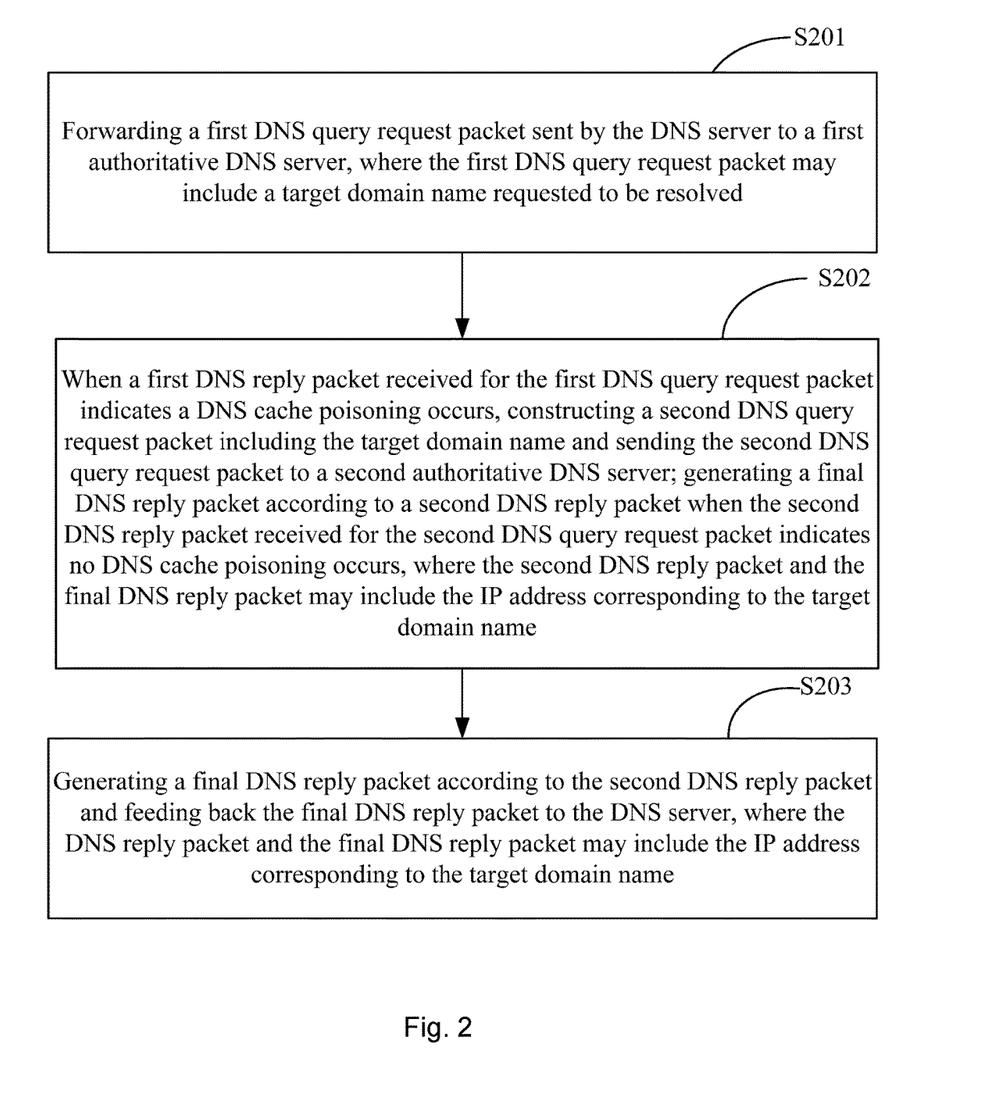
FIG. 2 illustrates a flow diagram of a method of preventing DNS cache poisoning according to an embodiment of the present disclosure.

In order to explain how to prevent DNS cache poisoning in the present disclosure in detail, in conjunction with the schematic diagram of the application scenario shown in FIG. 1, FIG. 2 illustrates a flow diagram of a method of preventing DNS cache poisoning according to an embodiment of the present disclosure. The preventing equipment 120 may execute the method which may comprise steps S201-S203.

At step S201, the preventing equipment may forward a first DNS query request packet sent by the DNS server to a first authoritative DNS server. The first DNS query request packet may include a target domain name requested to be resolved.

In an embodiment of the present disclosure, when an IP address corresponding to a target domain name requested to be resolved by a client does not exist in the DNS server 110, the DNS server 110 may send a first DNS query request packet including the target domain name to the authoritative DNS server 131, so as to request the authoritative DNS server 131 to query about the IP address corresponding to the target domain name. As shown in FIG. 1, the first DNS query request packet may be first transmitted to the preventing equipment 120, and then forwarded by the preventing equipment 120 to the authoritative DNS server 131.

Related descriptions of a source IP address, a destination IP address, a source port, a destination port and a DNS request ID included in the first DNS query request packet may refer to relevant descriptions made above, which are not described in detail redundantly herein.

At step S202, when a first DNS reply packet received for the first DNS query request packet indicates a DNS cache poisoning attack occurs, the preventing equipment may construct a second DNS query request packet including the target domain name and send the second DNS query request packet to a second authoritative DNS server. The preventing equipment may generate a final DNS reply packet according to a second DNS reply packet when the second DNS reply packet received for the second DNS query request packet indicates no DNS cache poisoning attack occurs. The second DNS reply packet and the final DNS reply packet may include the IP address corresponding to the target domain name.

As shown in FIG. 1, a DNS reply packet fed back by the authoritative DNS server 131 and a fake DNS reply packet sent by the attacking server 140 may both be first transmitted to the preventing equipment 120. The received DNS reply packets may be checked by the preventing equipment 120. For the sake of the convenience of description, the DNS reply packets for the first DNS query request packet, which are received by the preventing equipment 120 after sending the first DNS query request packet to the authoritative DNS server 131, are uniformly described in embodiments of the present disclosure as the first DNS reply packets.

If the attacking server 140 intends to achieve a DNS cache poisoning attack, it may send a large number of fake DNS reply packets. These fake DNS reply packets may carry different destination ports and DNS request IDs. The attacking server 140 may try multiple times to enable the fake DNS reply packets to pass the matching check. In an embodiment, the preventing equipment 120 may check information characteristic of the first DNS reply packets received for the first DNS query request packet. For example, the information characteristic may include a number, destination ports and DNS request IDs of the first DNS reply packets received for the first DNS query request packet. For example, if the preventing equipment 120 receives a plurality of first DNS reply packets within a preset time period, e.g., 3 seconds, and these first DNS reply packets have different destination ports and/or different DNS request IDs, it may indicate a DNS cache poisoning attack occurs.

In order to prevent DNS cache poisoning, in an embodiment, the preventing equipment 120 may construct the second DNS query request packet including the target domain name, and send the second DNS query request packet to other authoritative DNS server, e.g., the authoritative DNS server 132, in order to obtain the IP address corresponding to the target domain name.

Subsequently, the preventing equipment 120 may receive a DNS reply packet fed back by the authoritative DNS server 132 for the second DNS query request packet. Certainly, the attacking server 140 may still continue to send fake DNS reply packets. For the sake of the convenience of description, in an embodiment of the present disclosure, the DNS reply packets for the second DNS query request packet, which are received by the preventing equipment 120 after sending the second DNS query request packet to the other authoritative DNS server, are referred to as the second DNS reply packets. The preventing equipment 120 may perform the matching check on the second DNS reply packets received for the second DNS query request packet and select a second DNS reply packet not attacked by DNS cache poisoning, e.g., selecting received only one second DNS reply packet.

At step S203, the preventing equipment may generate a final DNS reply packet according to the second DNS reply packet and feed back the final DNS reply packet to the DNS server. The DNS reply packet and the final DNS reply packet may include the IP address corresponding to the target domain name.

After the step S202 is finished and the preventing equipment 120 selects the second DNS reply packet not attacked by DNS cache poisoning, the preventing equipment 120 may generate the final DNS reply packet according to the second DNS reply packet and feed back the final DNS reply packet to the DNS server 110 to inform the DNS server 110 of the IP address corresponding to the target domain name requested to be resolved.

In the method of preventing DNS cache poisoning of an embodiment, the preventing equipment 120 may send a DNS query request packet to any other authoritative DNS server when the occurrence of the DNS cache poisoning attack is determined. Since it is difficult for the attacking server 140 to know which other authoritative DNS server the preventing equipment 120 sends the DNS query request packet to, the attacking server 140 may not readily construct a DNS reply packet capable of passing the matching check. Thus, probability for achieving DNS cache poisoning by the attacking server 140 may be greatly reduced. Also, without configuring the DNS server, the method may be good in applicability and simple in deployment.

Figure 3:
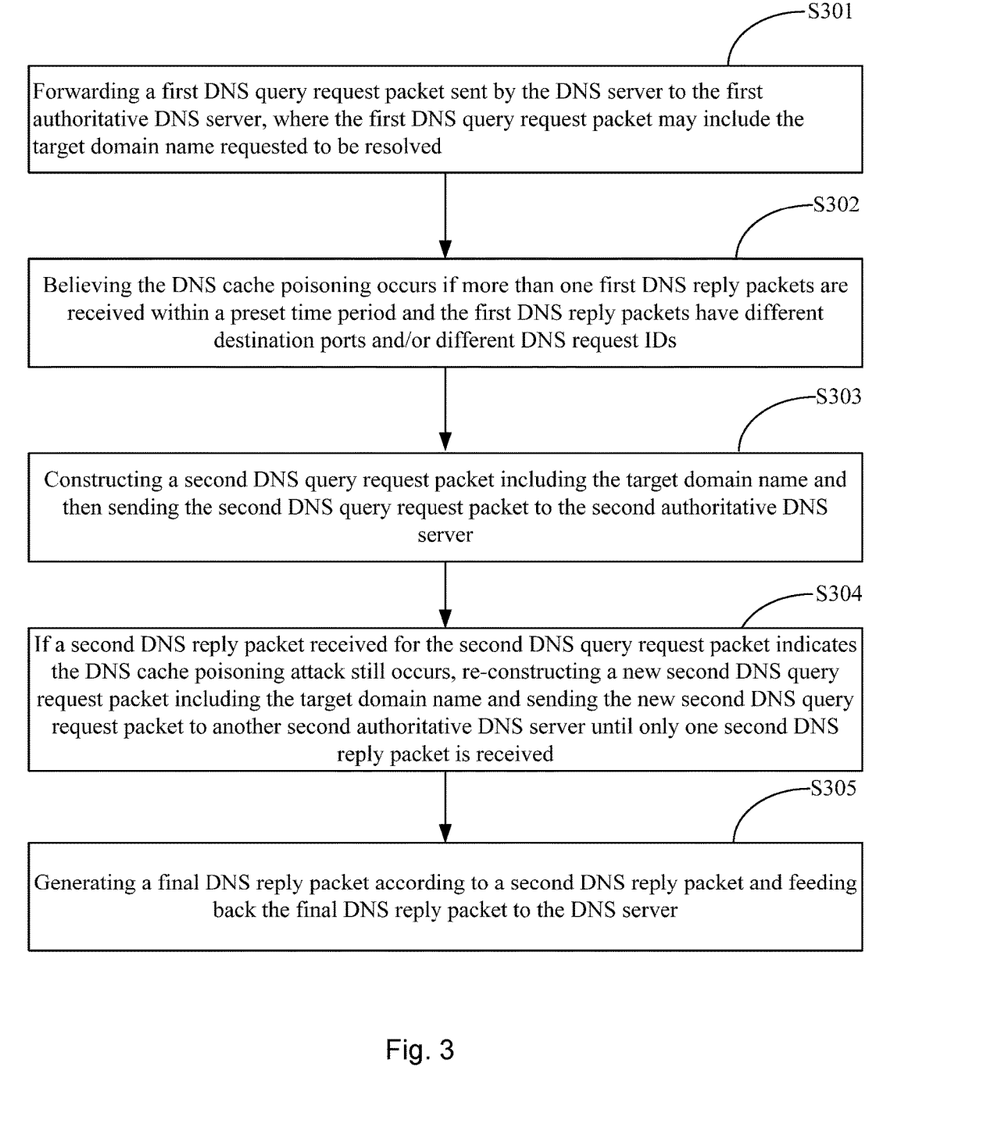
FIG. 3 illustrates a flow diagram of a method of preventing DNS cache poisoning according to another embodiment of the present disclosure.

In order to explain how to prevent DNS cache poisoning in the present disclosure in more detail, further detailed descriptions may be made on the basis of the above embodiment shown in FIG. 2. FIG. 3 is a flow diagram of a method of preventing DNS cache poisoning according to another embodiment of the present disclosure. The preventing equipment 120 may execute the method which may comprise following steps S301-S305.

At step S301, the preventing equipment may forward a first DNS query request packet sent by the DNS server to the first authoritative DNS server. The first DNS query request packet may include the target domain name requested to be resolved.

Related descriptions of this step may refer to descriptions of the step S201 in the above embodiment, and this step thus is not described in detail redundantly herein.

In an embodiment, the preventing equipment 120 may record information characteristic of the first DNS query request packet upon receiving the first DNS query request packet sent by the DNS server 110. For example, the information characteristic may include a destination IP address, e.g., the IP address of the first authoritative DNS server 131, a source port, e.g., 1234, and a DNS request ID, e.g., 4321, in order to facilitate later operations. A specific purpose of recording the information characteristics may be shown in following descriptions.

At step S302, the preventing equipment 120 may believe the DNS cache poisoning occurs if more than one first DNS reply packets are received within a preset time period and the first DNS reply packets have different destination ports and/or different DNS request IDs.

Related descriptions of this step may refer to descriptions of the step S202 in the above embodiment, and this step thus is not described in detail redundantly herein.

At step S303, the preventing equipment may construct the second DNS query request packet including the target domain name and then send the second DNS query request packet to the second authoritative DNS server.

In an embodiment, the preventing equipment 120 may construct the second DNS query request packet including the target domain name when the DNS cache poisoning occurs through the execution of the step S302. The preventing equipment 120 may select another authoritative DNS server, e.g., the authoritative DNS server 132 to which no DNS query request packet is sent yet, as the second authoritative DNS server, and send the second DNS query request packet to the second authoritative DNS server.

The destination address of the second DNS query request packet may be an IP address of the second authoritative DNS server. The source port and the DNS request ID of the second DNS query request packet may be selected at random. For example, the source port of the second DNS query request packet may be 2222 and the DNS request ID thereof may be 4444.

In an example, as shown in FIG. 1, each of the authoritative DNS servers 131-13N may save an identical domain name-IP address mapping relation. A sequence list of authoritative DNS servers may be preset in the preventing equipment 120. A name and a corresponding identifier of each of the authoritative DNS servers may be saved in the sequence list. The identifier may be used to indicate whether a DNS query request packet is already sent to the corresponding authoritative DNS server within a preset time period up to current time, e.g., 5 minutes. For example, an identifier "0" may indicate that no DNS query request packet is sent to the corresponding authoritative DNS server within the preset time period up to the current time yet. An identifier "1" may indicate that a DNS query request packet is already sent to the corresponding authoritative DNS server within the preset time period up to the current time.

As shown in Table 1 below, an example of the sequence list is displayed.

TABLE 1

| Name of Authoritative DNS Server | Identifier |
|---|---|
| Authoritative DNS server 132 | 0 |
| Authoritative DNS server 133 | 0 |
| Authoritative DNS server 134 | 0 |
| . . . | 0 |

The preventing equipment 120 may traverse the sequence list shown in the above Table 1 when selecting the second authoritative DNS server. When an identifier of an authoritative DNS server by traversing is "0", the authoritative DNS server may be selected. For example, the identifier of the authoritative DNS server 132 is "0", the second DNS query request packet may be sent to the authoritative DNS server 132 to query about the IP address corresponding to the target domain name. Then, the preventing equipment 120 may also set the identifier corresponding to the authoritative DNS server 132 to "1" in the sequence list shown in the above Table 1, so as to indicate that the DNS query request packet is already sent to the authoritative DNS server 132.

In another example, when selecting the second authoritative DNS server, the preventing equipment 120 may first select an authoritative DNS server at random and then judge whether a DNS query request packet is already recently sent to the authoritative DNS server according to the sequence list shown in the above Table 1. For example, the preventing equipment 120 may determine the identifier corresponding to the authoritative DNS server as "0" according to the sequence list and then send the second DNS query request packet to the authoritative DNS server to query about the IP address corresponding to the target domain name. Subsequently, the preventing equipment 120 may also mark the authoritative DNS server as being already recently selected, e.g., setting the identifier corresponding to the authoritative DNS server to "1" in the sequence list shown in the above Table 1.

At step S304, if the second DNS reply packet received for the second DNS query request packet indicates the DNS cache poisoning attack still occurs, the preventing equipment may re-construct a new second DNS query request packet including the target domain name and send the new second DNS query request packet to another second authoritative DNS server until only one second DNS reply packet is received.

In this step, if the second DNS reply packet received for the second DNS query request packet indicates the DNS cache poisoning attack still occurs after the step S303 is finished, e.g., if a plurality of second DNS reply packets having different DNS request IDs are received, the preventing equipment 120 may re-construct a new second DNS query request packet, as described in the step S304. The new second DNS query request packet may include the target domain name requested to be resolved, and a source port and a DNS request ID of the new second DNS query request packet may be re-generated. For example, the source port of the new second DNS query request packet may be 3333 and the DNS request ID thereof may be 6666. The preventing equipment 120 may select another second authoritative DNS server, e.g., the authoritative DNS server 133, as the second authoritative DNS server, and send the new second DNS query request packet to the authoritative DNS server 133 as described in the step S304.

The second DNS reply packet may be considered as not being subjected to the DNS cache poisoning attack carried out by the attacking server 140 until the preventing equipment 120 receives only one second DNS reply packet for the new second DNS query request packet within a preset time period, e.g., 3 seconds.

At step S305, the preventing equipment may generate a final DNS reply packet according to the second DNS reply packet and feed back the final DNS reply packet to the DNS server.

Due to being fed back by another second authoritative DNS server, a source IP address, a destination port and a DNS request ID of the second DNS reply packet still cannot pass the matching check of the DNS server 110 although the second DNS reply packet may be considered as not being subjected to the DNS cache poisoning attack. Hence, the preventing equipment 120 may modify the second DNS reply packet after knowing the second DNS reply packet is correct, and feed back the modified second DNS reply packet as the final DNS reply packet to the DNS server 110, so that the final DNS reply packet may be sent to the DNS server 110 and pass the matching check of the DNS server 110.

Assuming that at step S305, the only one second DNS reply packet received for the second DNS query request packet indicates no DNS cache poisoning attack occurs after sending the second DNS query request packet to the authoritative DNS server 133, following modifications may be made: the source IP address of the second DNS reply packet may be modified to the destination IP address of the first DNS query request packet recorded in the step S301, e.g., the source IP address thereof may be modified from the IP address of the authoritative DNS server 133 to the IP address of the authoritative DNS server 131; the destination IP address of the second DNS reply packet may be modified from the IP address of the preventing equipment 120 to the IP address of the DNS server 110; the destination port included in the second DNS reply packet may be modified to the source port of the first DNS query request packet recorded in the step S301, e.g., the destination port thereof is modified from port 3333 to port 1234; the DNS request ID included in the second DNS reply packet may be modified to the DNS request ID of the first DNS query request packet recorded in the step S301, e.g., the DNS request ID thereof is modified from 6666 to 4321. The preventing equipment 120 may feed back the modified second DNS reply packet as the final DNS reply packet to the DNS server 110, so that the DNS server 110 may obtain the IP address corresponding to the target domain name requested to be resolved.

In an embodiment, the preventing equipment 120 may save the first DNS reply packet that is first received by the preventing equipment 120. Then, when the preventing equipment 120 has sent the second DNS query request packet to all authoritative DNS servers except the first authoritative DNS server 131 and all second DNS reply packets correspondingly received indicate a DNS cache poisoning attack occurs, the first DNS reply packet first received may be fed back to the DNS server 110 so that the DNS server 110 may obtain an IP address. Certainly, it may be possible that the first DNS reply packet first received is a fake DNS reply packet sent by the attacking server 140. In this case, the preventing equipment 120 may also send alarm information to a network administrator to warn the network administrator of a DNS cache poisoning attack risk.

In an example, the alarm information may include the target domain name and the IP address corresponding to the target domain name included in the first DNS reply packet so that the network administrator may make an analysis according to the alarm information to find out the domain name and the IP address that are at risk of the DNS cache poisoning attack, thereby preventing a user from being guided to a malicious URL when accessing the domain name, and impacting user experience and even the security of the user.

In an embodiment, as can be seen from foregoing descriptions, the preventing equipment 120 may reply to the DNS server 110 with a DNS reply packet according to the second DNS reply packet or the first DNS reply packet. When the preventing equipment 120 replies to the DNS server 110 with the DNS reply packet according to the second DNS reply packet, prompting information may also be sent to the network administrator to warn the network administrator of success in preventing DNS cache poisoning. When the preventing equipment 120 replies to the DNS server 110 with the DNS reply packet according to the first DNS reply packet, other prompting information, i.e., the alarm information, may be sent to the network administrator to warn the network administrator of the DNS cache poisoning attack risk. For example, an information indicator light may be disposed on the preventing equipment 120. When the information indicator light turns red, it may indicate that there is a risk of DNS cache poisoning. When the information indicator light turns green, it may indicate no occurrence of DNS cache poisoning or success in preventing DNS cache poisoning.

According to the method of preventing DNS cache poisoning provided by this disclosure, when more than one first DNS reply packets are received by the preventing equipment and the plurality of DNS reply packets have different destination ports and/or different DNS request IDs, it may determine a DNS cache poisoning attack occurs. The preventing equipment may select another authoritative DNS server and continue sending the second DNS query request packet thereto until only one DNS reply packet is received to confirm the only DNS reply packet as not being subjected to the DNS cache poisoning attack. Since it is difficult for the attacking server to know which other authoritative DNS server the preventing equipment sends the DNS query request packet to, the attacking server may not readily construct the DNS reply packet capable of passing the matching check. Thus, probability of achieving DNS cache poisoning by the attacking server may be greatly reduced. Also, without configuring the DNS server, the method may be good in applicability and simple in deployment.

Corresponding to above embodiments of the method of preventing DNS cache poisoning, the present disclosure also provides embodiments of a device for preventing DNS cache poisoning.

Figure 4:
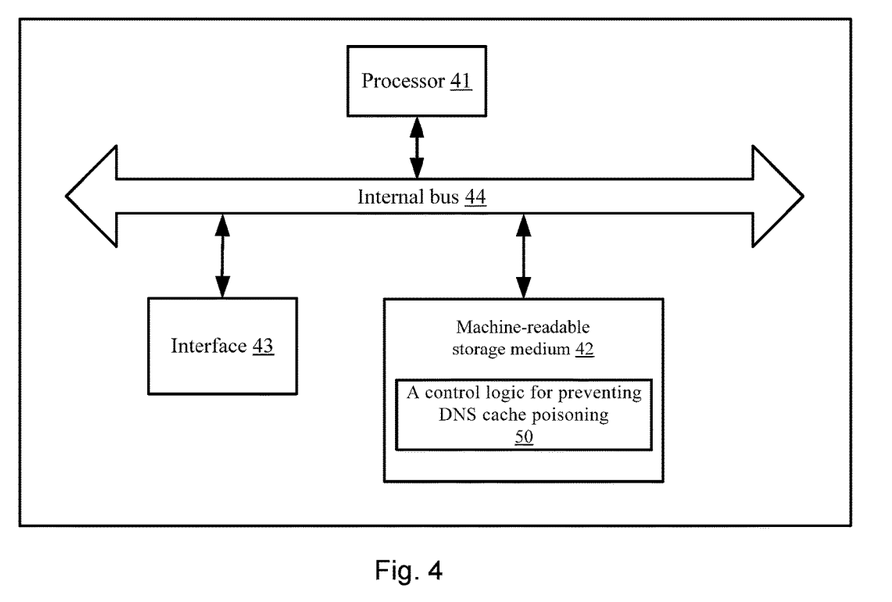
FIG. 4 is a hardware structure diagram of a device for preventing DNS cache poisoning according to an embodiment of the present disclosure.

A device for preventing DNS cache poisoning according to an embodiment of the present disclosure may be applied to the preventing equipment, and may also be applied to other network equipment, which is not limited herein. The device for preventing DNS cache poisoning may be implemented by software, and may also be implemented by hardware or a combination of software and hardware. FIG. 4 is a hardware structure diagram of a device for preventing DNS cache poisoning according to an embodiment of the present disclosure. The device may comprise a processor 41 and a machine-readable storage medium 42, where the processor 41 and the machine-readable storage medium 42 generally may be interconnected via an internal bus 44. In other possible implementations, the device may further comprise a network interface 43 to enable the device to communicate with other devices or parts. The device may further comprise other hardware according to actual functions, which are not redundantly described herein.

In different examples, the machine-readable storage medium 42 may be: RAM (Random Access Memory), a volatile memory, a non-volatile memory, a flash memory, a memory drive (e.g., a hard disk drive), solid state hard disk, any type of memory disk (e.g., optical disks, DVDs, and the like), or a similar memory medium, or a combination thereof.

Further, the machine-readable storage medium 42 may store machine-executable instructions corresponding to a control logic 50 for preventing DNS cache poisoning. Functionally divided, referring to FIG. 5, a functional module diagram of the control logic for preventing DNS cache poisoning according to an embodiment of the present disclosure is illustrated. The control logic 50 may comprise a forwarding unit 51, a processing unit 52 and a first replying unit 53.

Figure 5:
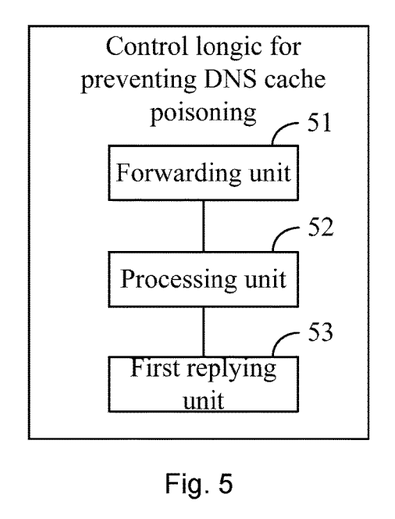
FIG. 5 illustrates a functional module diagram of a control logic for preventing DNS cache poisoning according to an embodiment of the present disclosure.

The forwarding unit 51 may be configured to forward a first DNS query request packet sent by a DNS server to a first authoritative DNS server. The first DNS query request packet may include a target domain name requested to be resolved.

The processing unit 52 may be configured to construct a second DNS query request packet including the target domain name and send the second DNS query request packet to a second authoritative DNS server when a first DNS reply packet received for the first DNS query request packet indicates a DNS cache poisoning attack occurs, and to generate a final DNS reply packet according to a second DNS reply packet when the second DNS reply packet received for the second DNS query request packet indicates no DNS cache poisoning attack occurs. The second DNS reply packet and the final DNS reply packet may include an IP address corresponding to the target domain name.

The first replying unit 53 may be configured to feed back the final DNS reply packet to the DNS server.

Figure 6:
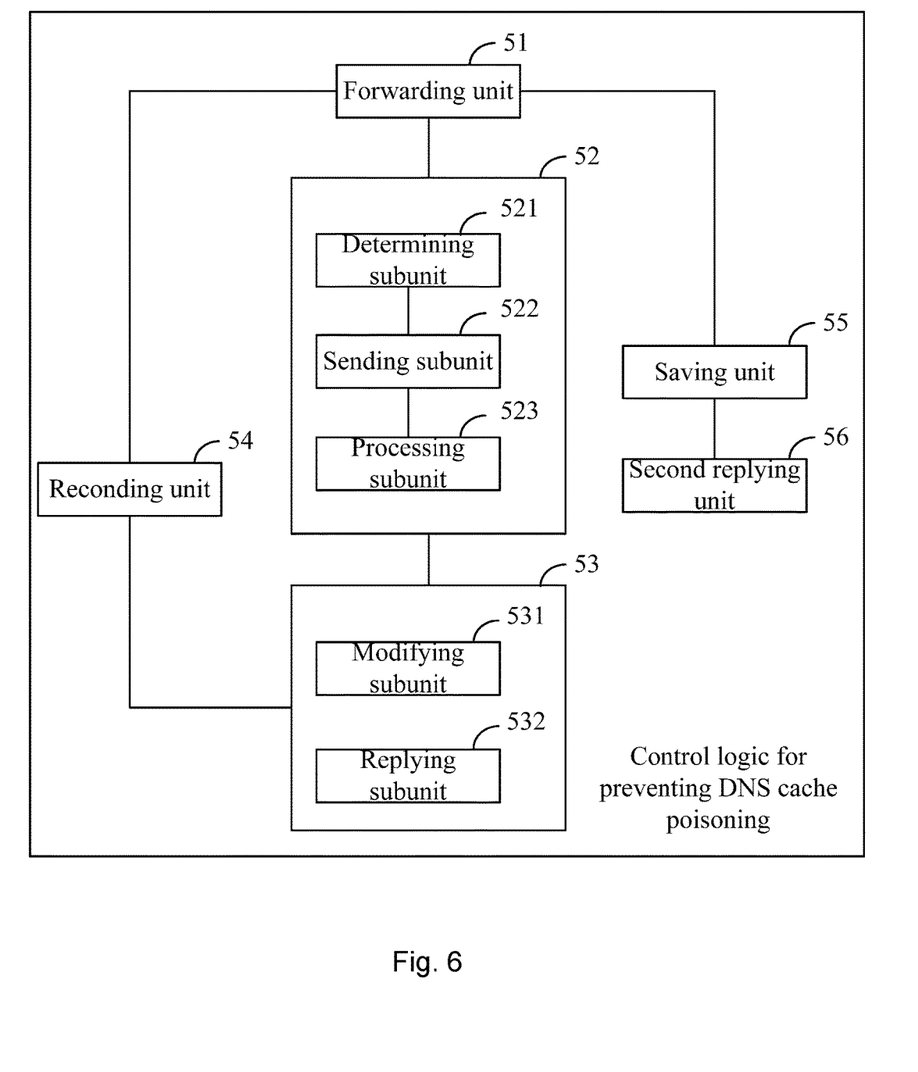
FIG. 6 illustrates a functional module diagram of a control logic for preventing DNS cache poisoning according to another embodiment of the present disclosure.

Referring to FIG. 6, the functional module diagram of the control logic for preventing DNS cache poisoning according to an embodiment of the present disclosure may be illustrated. The embodiment may be based on the control logic shown in above FIG. 5, where the processing unit 52 may comprise a determining subunit 521, a sending subunit 522, and a processing subunit 523.

The determining subunit 521 may be configured to determine the occurrence of the DNS cache poisoning attack if more than one first DNS reply packets for the first DNS query request packet are received within a preset time period and the first DNS reply packets have different destination ports and/or different DNS request IDs.

The sending subunit 522 may be configured to re-construct a new second DNS query request packet and send the new second DNS query request packet to another second authoritative DNS server when the second DNS reply packet received for the second DNS query request packet indicates the DNS cache poisoning attack still occurs.

The processing subunit 523 may be configured to, if the second DNS reply packet received for the new second DNS query request packet indicates the DNS cache poisoning attack still occurs, re-construct a new second DNS query request packet including the target domain name, and send the new second DNS query request packet to yet another second authoritative DNS server until only one second DNS reply packet for the new second DNS query request packet is received within a preset time period.

The control logic may also comprise a recording unit 54.

The recording unit 54 may be configured to record the information characteristic of the first DNS query request packet when the first DNS query request packet is received. The information characteristic of the first DNS query request packet may include an IP address of the first authoritative DNS server, a source port, and a DNS request ID.

The first replying unit 53 may include a modifying subunit 531 and a replying subunit 532.

The modifying subunit 531 may be configured to modify a source IP address of the second DNS reply packet to the IP address of the first authoritative server in the information characteristic of the first DNS query request packet, modify a destination IP address of the second DNS reply packet to an IP address of the DNS server, modify a destination port of the second DNS reply packet to the source port in the information characteristic of the first DNS query request packet, and modify a DNS request ID of the second DNS reply packet to the DNS request ID in the information characteristic of the first DNS query request packet.

The replying subunit 532 may be configured to feed back the modified second DNS reply packet as the final DNS reply packet to the DNS server.

The control logic may also comprise a saving unit 55 and a second replying unit 56.

The saving unit 55 may be configured to save the first DNS reply packet first received.

The second replying unit 56 may be configured to feed back the first DNS reply packet first received to the DNS server and to send alarm information for warning about a DNS cache poisoning risk. In this way, the DNS server may obtain the IP address corresponding to the target domain when the second DNS query request packet has been sent to all authoritative DNS servers except the first authoritative DNS server and all second DNS reply packets correspondingly received indicate a DNS cache poisoning attack occurs.

By taking software implementation as an example, the following may further describe how the device for preventing DNS cache poisoning executes the control logic 50 for preventing DNS cache poisoning. Here, the control logic 50 for preventing DNS cache poisoning in the present disclosure may be interpreted as machine-executable instructions stored in the machine-readable storage medium 42. When the processor 41 on the device for preventing DNS cache poisoning of the present disclosure executes the control logic 50 for preventing DNS cache poisoning, by invoking the machine-executable instructions corresponding to the control logic 50 for preventing DNS cache poisoning stored on the machine-readable storage medium 42, the processor 41 may be caused to:

forward a first DNS query request packet sent by a DNS server to a first authoritative DNS server, where the first DNS query request packet may include a target domain name requested to be resolved;

construct a second DNS query request packet including the target domain name when a first DNS reply packet received for the first DNS query request packet indicates a DNS cache poisoning attack occurs;

send the second DNS query request packet to a second authoritative DNS server that is different from the first authoritative DNS server but has a same domain name-IP address mapping relation with the first authoritative DNS server;

generate a final DNS reply packet according to a second DNS rely packet when the second DNS reply packet received for the second DNS query request packet indicates no DNS cache poisoning attack occurs, wherein the second DNS reply packet and the final DNS reply packet may include an IP address corresponding to the target domain name; and feed back the final DNS reply packet to the DNS server.

In one embodiment, when the first DNS reply packet received for the first DNS query request packet indicating the DNS cache poisoning attack occurs may comprise two or more first DNS reply packets for the first DNS query request packet are received within a preset time period and the first DNS reply packets have different destination ports.

In one embodiment, when the first DNS reply packet received for the first DNS query request packet indicating the DNS cache poisoning attack occurs may comprise two or more first DNS reply packets for the first DNS query request packet are received within a preset time period and the first DNS reply packets have different DNS request IDs.

In one embodiment, the machine-executable instructions cause the processor to:

re-construct a new second DNS query request packet when the second DNS reply packet received for the second DNS query request packet indicates the DNS cache poisoning attack occurs;

send the new second DNS query request packet to another second authoritative DNS server; and determine whether a new second DNS reply packet received for the new second DNS query request packet indicates the DNS cache poisoning attack occurs.

In one embodiment, when the second DNS reply packet received for the second DNS query request packet indicating no DNS cache poisoning attack occurs comprises receiving, by the processor, only one second DNS reply packet for the second DNS query request packet within a preset time period.

In one embodiment, the machine-executable instructions further cause the processor to record information characteristic of the first DNS query request packet when the first DNS query request packet is received, wherein the information characteristic of the first DNS query request packet may include: an IP address of the first authoritative DNS server, a source port and a DNS request ID.

In one embodiment, when generating the final DNS reply packet according to the second DNS reply packet, the machine-executable instructions cause the processor to:

modify a source IP address of the second DNS reply packet to the IP address of the first authoritative server in the information characteristic of the first DNS query request packet;

modify a destination IP address of the second DNS reply packet to an IP address of the DNS server;

modify a destination port of the second DNS reply packet to the source port in the information characteristic of the first DNS query request packet;

modify a DNS request ID of the second DNS reply packet to the DNS request ID in the information characteristic of the first DNS query request packet; and take the modified second DNS reply packet as the final DNS reply packet.

In one embodiment, the machine-executable instructions further cause the processor to select an authoritative DNS server to which no DNS query request packet is sent yet within a specific time period from a plurality of preset authoritative DNS servers as the second authoritative DNS server when the first DNS reply packet received for the first DNS query request packet indicates a DNS cache poisoning attack occurs.

In one embodiment, the machine-executable instructions further cause the processor to:

save the first one of the received first DNS reply packets; and feed back the saved first DNS reply packet to the DNS server when all authoritative DNS servers except the first authoritative DNS server have been sent with a second DNS query request packet and all second DNS reply packets correspondingly received indicate a DNS cache poisoning attack occurs.

In one embodiment, the machine-executable instructions further cause the processor to send alarm information for prompting a DNS cache poisoning risk to the DNS server when feeding back the saved DNS reply packet first received to the DNS server.

The specific details of the implementation process of the functions and roles of the respective units in the above device are set forth in the implementation process of the corresponding steps in the above method, which are not redundantly described herein.

For the device embodiments that substantially correspond to the method embodiments, the correlations therebetween just refer to part of the descriptions of the method embodiments. The device embodiments described above are merely schematic, wherein the units explained as separate components may be physically separated or not, and components displayed as units may be physical units or not, which can be located in the same place or distributed to a plurality of network units. Part or all of the modules may be selected according to actual requirements to achieve the purposes of the schemes of the present disclosure. A person skilled in the art can understand and implement these schemes without creative efforts.

It should be appreciated that although terms "first", "second", "third", and the like may be used in the present disclosure to describe various information, such information should not be limited to these terms. These terms are merely used to distinguish the same type of information from one another. For example, without departing from the scope of the present disclosure, first information may also be referred to as second information, or vice versa. Depending on the context, For example, the word "if" may be interpreted as "upon" or "when" or "determine in response".

The above are merely preferred embodiments of the present disclosure rather than limiting the present disclosure. Any modification, equivalent replacement, improvement and the like made within the spirit and principles of the present disclosure should fall into the scope of protection of the present disclosure.

The invention claimed is:

1. A method of preventing Domain Name System (DNS) cache poisoning, comprising:

forwarding, by a preventing equipment, a first DNS query request packet sent by a DNS server to a first authoritative DNS server, wherein the first DNS query request packet includes a target domain name requested to be resolved;

constructing, by the preventing equipment, a second DNS query request packet including the target domain name when a first DNS reply packet received for the first DNS query request packet indicates a DNS cache poisoning attack occurs, wherein the second DNS query request packet comprises a source port and a first DNS request identity;

sending, by the preventing equipment, the second DNS query request packet to a second authoritative DNS server, wherein the second authoritative DNS server is different from the first authoritative DNS server and has a same mapping relation between domain name and Internet Protocol (IP) address with the first authoritative DNS server;

generating, by the preventing equipment, a final DNS reply packet according to a second DNS reply packet when the second DNS reply packet received for the second DNS query request packet indicates no DNS cache poisoning attack occurs, wherein the second DNS reply packet and the final DNS reply packet include an IP address corresponding to the target domain name, the second DNS reply packet comprises a destination port and a second DNS request identity, and when a number of the second DNS reply packets received for the second DNS query request packet within a preset time period is one, the destination port matches the source port, and second DNS request identity matches the first DNS request identity, it indicates that no DNS cache poisoning attack occurs; and feeding back, by the preventing equipment, the final DNS reply packet to the DNS server.

2. The method according to claim 1, wherein the first DNS reply packet received for the first DNS query request packet indicating the DNS cache poisoning attack occurs comprises:

two or more first DNS reply packets for the first DNS query request packet are received by the preventing equipment within the preset time period; and destination ports in the first DNS reply packets are different.

3. The method according to claim 1, wherein the first DNS reply packet received for the first DNS query request packet indicating the DNS cache poisoning attack occurs comprises:
- two or more first DNS reply packets for the first DNS query request packet are received by the preventing equipment within the preset time period; and
- DNS request identities (IDs) in the first DNS reply packets are different.

4. The method according to claim 1, further comprising:
- re-constructing, by the preventing equipment, a new second DNS query request packet when the second DNS reply packet received for the second DNS query request packet indicates the DNS cache poisoning attack occurs;
- sending, by the preventing equipment, the new second DNS query request packet to another second authoritative DNS server; and
- determining, by the preventing equipment, whether a new second DNS reply packet received for the new second DNS query request packet indicates the DNS cache poisoning attack occurs.

5. The method according to claim 1, further comprising:
- recording, by the preventing equipment, information characteristic of the first DNS query request packet when the first DNS query request packet is received, wherein the information characteristic of the first DNS query request packet includes:
  - an IP address of the first authoritative DNS server,
  - a source port, and
  - a DNS request ID.

6. The method according to claim 5, wherein generating the final DNS reply packet according to the second DNS reply packet comprises:
- modifying, by the preventing equipment, a source IP address of the second DNS reply packet to the IP address of the first authoritative server in the information characteristic of the first DNS query request packet;
- modifying, by the preventing equipment, a destination IP address of the second DNS reply packet to an IP address of the DNS server;
- modifying, by the preventing equipment, the destination port of the second DNS reply packet to the source port in the information characteristic of the first DNS query request packet;
- modifying, by the preventing equipment, a DNS request ID of the second DNS reply packet to the DNS request ID in the information characteristic of the first DNS query request packet; and
- taking, by the preventing equipment, the modified second DNS reply packet as the final DNS reply packet.

7. The method according to claim 1, further comprising:
- selecting, by the preventing equipment, an authoritative DNS server to which no DNS query request packet is sent yet within a specific time period from a plurality of preset authoritative DNS servers as the second authoritative DNS server when the first DNS reply packet received for the first DNS query request packet indicates the DNS cache poisoning attack occurs.

8. The method according to claim 1, further comprising:
- saving, by the preventing equipment, the first one of the received first DNS reply packets;
- feeding back, by the preventing equipment, the saved first DNS reply packet to the DNS server if all authoritative DNS servers except the first authoritative DNS server have been sent with the second DNS query request packet and all second DNS reply packets correspondingly received indicate the DNS cache poisoning attack occurs.

9. The method according to claim 8, further comprising:
- sending, by the preventing equipment, alarm information for prompting a DNS cache poisoning risk to the DNS server when feeding back the saved first DNS reply packet to the DNS server.

10. A device for preventing DNS cache poisoning, comprising a processor, which invokes machine readable instructions corresponding to a control logic for preventing DNS cache poisoning stored on a storage medium and executes the machine readable instructions to:
- forward a first DNS query request packet sent by a DNS server to a first authoritative DNS server, wherein the first DNS query request packet includes a target domain name requested to be resolved;
- construct a second DNS query request packet including the target domain name when a first DNS reply packet received for the first DNS query request packet indicates a DNS cache poisoning attack occurs, wherein the second DNS query request packet comprises a source port and a first DNS request identity;
- send the second DNS query request packet to a second authoritative DNS server, wherein the second authoritative DNS server is different from the first authoritative DNS server and has a same mapping relation between domain name and IP address mapping with the first authoritative DNS server;
- generate a final DNS reply packet according to a second DNS reply packet when the second DNS reply packet received for the second DNS query request packet indicates no DNS cache poisoning attack occurs, wherein the second DNS reply packet and the final DNS reply packet include an IP address corresponding to the target domain name, the second DNS reply packet comprises a destination port and a second DNS request identity, and when the number of the second DNS reply packets received for the second DNS query request packet within a preset time period is one, the destination port matches the source port, and second DNS request identity matches the first DNS request identity, it indicates that no DNS cache poisoning attack occurs; and
- feed back the final DNS reply packet to the DNS server.

11. The device according to claim 10, wherein when the first DNS reply packet received for the first DNS query request packet indicating the DNS cache poisoning attack occurs comprises:
- two or more first DNS reply packets for the first DNS query request packet are received within the preset time period; and
- destination ports in the first DNS reply packets are different.

12. The device according to claim 10, wherein the first DNS reply packet received for the first DNS query request packet indicating the DNS cache poisoning attack occurs comprises:
- two or more first DNS reply packets for the first DNS query request packet are received within the preset time period; and
- DNS request IDs in the first DNS reply packets are different.

13. The device according to claim 10, wherein the machine readable instructions cause the processor to:
- re-construct a new second DNS query request packet when the second DNS reply packet received for the second DNS query request packet indicates the DNS cache poisoning attack occurs;

send the new second DNS query request packet to another second authoritative DNS server; and determine whether a new second DNS reply packet received for the new second DNS query request packet indicates the DNS cache poisoning attack occurs.

14. The device according to claim 10, wherein the machine readable instructions further cause the processor to:

record information characteristic of the first DNS query request packet when the first DNS query request packet is received, wherein the information characteristic of the first DNS query request packet includes:

an IP address of the first authoritative DNS server, a source port, and a DNS request ID.

15. The device according to claim 14, wherein when generating the final DNS reply packet according to the second DNS reply packet, the machine readable instructions cause the processor to:

modify a source IP address of the second DNS reply packet to the IP address of the first authoritative DNS server in the information characteristic of the first DNS query request packet;

modify a destination IP address of the second DNS reply packet to an IP address of the DNS server;

modify a destination port of the second DNS reply packet to the source port in the information characteristic of the first DNS query request packet;

modify a DNS request ID of the second DNS reply packet to the DNS request ID in the information characteristic of the first DNS query request packet; and take the modified second DNS reply packet as the final DNS reply packet.

16. The device according to claim 10, wherein the machine readable instructions further cause the processor to:

select an authoritative DNS server to which no DNS query request packet is sent yet within a specific time period from a plurality of preset authoritative DNS servers as the second authoritative DNS server when the first DNS reply packet received for the first DNS query request packet indicates a DNS cache poisoning attack occurs.

17. The device according to claim 10, wherein the machine readable instructions further cause the processor to:

save the first one of the received first DNS reply packets; and feed back the saved first DNS reply packet to the DNS server if all authoritative DNS servers except the first authoritative DNS server have been sent with the second DNS query request packet and all second DNS reply packets correspondingly received indicate the DNS cache poisoning attack occurs.

18. The device according to claim 17, wherein the machine readable instructions further cause the processor to:

send alarm information for prompting a DNS cache poisoning risk to the DNS server when feeding back the saved first DNS reply packet to the DNS server.

\* \* \* \* \*